United States Patent [19]
Fenwick et al.

[11] Patent Number: 5,625,805
[45] Date of Patent: Apr. 29, 1997

[54] CLOCK ARCHITECTURE FOR SYNCHRONOUS SYSTEM BUS WHICH REGULATES AND ADJUSTS CLOCK SKEW

[75] Inventors: David M. Fenwick, Chelmsford; Daniel Wissell, Acton; Richard Watson, Harvard; Denis Foley, Shrewsbury, all of Mass.

[73] Assignee: Digital Equipment Corporation, Maynard, Mass.

[21] Appl. No.: 269,223

[22] Filed: Jun. 30, 1994

[51] Int. Cl.⁶ ............................................. G06F 1/10
[52] U.S. Cl. ................................................ 395/558
[58] Field of Search ........................ 395/550; 371/1; 327/165, 261, 262, 276

[56] References Cited

U.S. PATENT DOCUMENTS

| | | | |
|---|---|---|---|
| 5,040,109 | 8/1991 | Bowhill et al. | 364/200 |
| 5,083,100 | 1/1992 | Hawkins et al. | 333/164 |
| 5,164,677 | 11/1992 | Hawkins et al. | 328/55 |
| 5,272,390 | 12/1993 | Watson, Jr. et al. | 307/269 |
| 5,309,035 | 5/1994 | Watson, Jr. et al. | 307/269 |
| 5,369,640 | 11/1994 | Watson et al. | 371/1 |

*Primary Examiner*—Thomas M. Heckler
*Assistant Examiner*—Dennis M. Butler
*Attorney, Agent, or Firm*—Denis G. Maloney; Arthur W. Fisher

[57] ABSTRACT

A synchronous computer system is described. The system is a multiprocessor system having a bus system clock and a processor clock for each processor. The system includes a synchronous computer system bus and a plurality of circuit modules coupled to the synchronous bus with at least two of the modules having at least one processor, with the processor modules having the at least one processor which runs asynchronously to each of the other processors while the processor modules are synchronous to the system bus. The system further includes clock generator means for providing a corresponding plurality of clock signals and a plurality of conductors coupled between said clock generating means and said plurality of modules. Each of said conductors have electrical paths with substantially the same electrical path length, with each one of said modules further including means, coupled to a corresponding one of said conductors and disposed on said module, for regulating and adjusting skew between clock signals on said module.

7 Claims, 5 Drawing Sheets

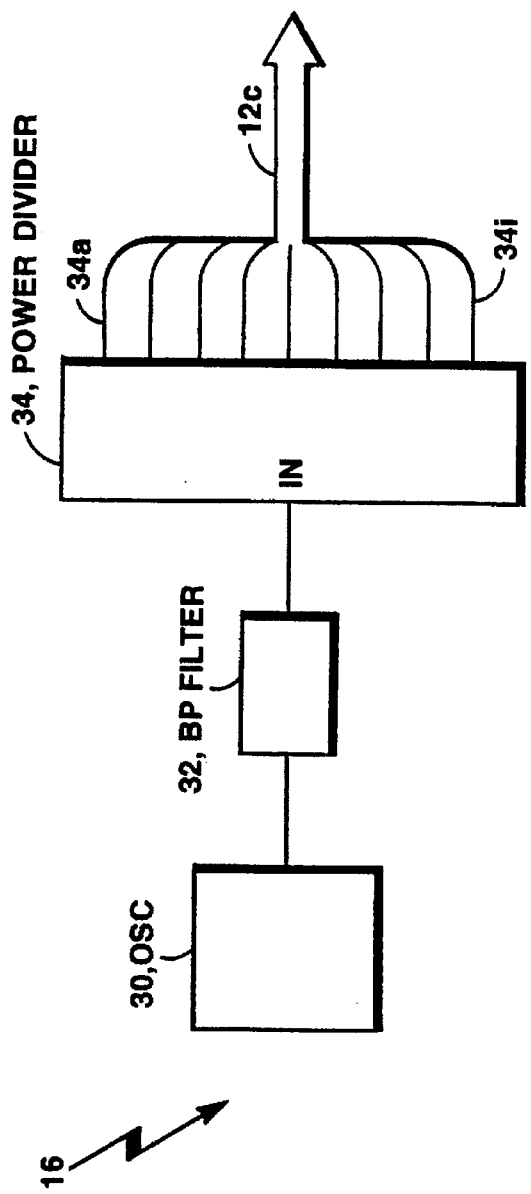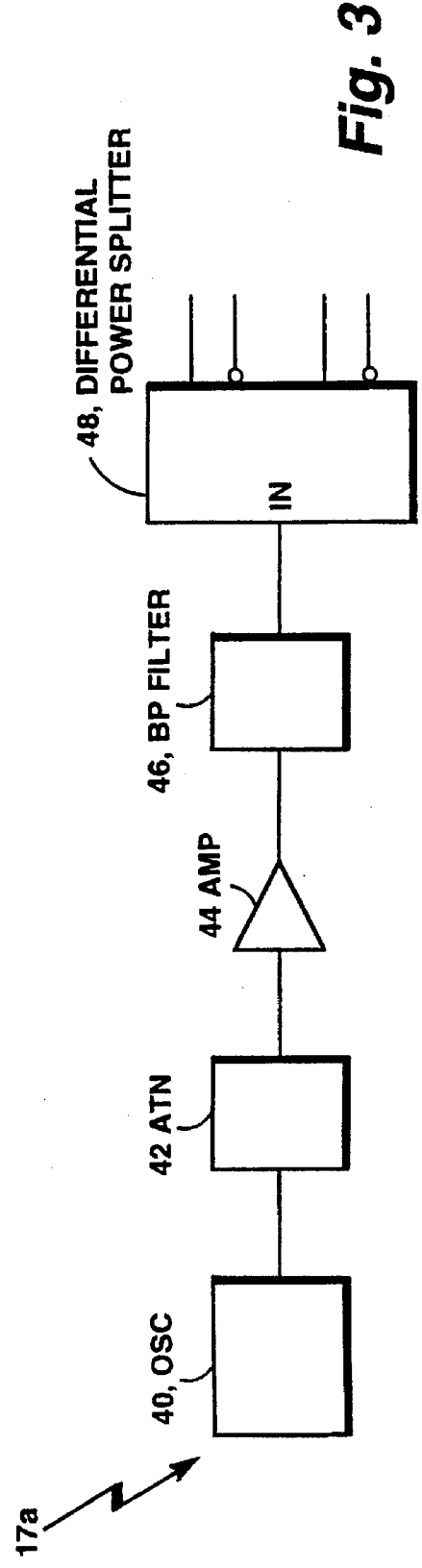

CLOCK ARCHITECTURE FOR SYNCHRONOUS SYSTEM BUS WHICH REGULATES AND ADJUSTS CLOCK SKEW

BACKGROUND OF THE INVENTION

This invention relates generally to computer systems and more particularly to distribution of clock signals and operation of synchronous busses in a synchronous computer system.

As it is known in the art, one type of computer system generally referred to as a synchronous computer system having a synchronous bus includes a plurality of modules of different functionality coupled together via the system bus. Each of said modules in a synchronous computer system operate by a synchronization signal which is generally referred to as a clock signal.

As computer systems operated at higher clock frequencies fostered by the development of faster microprocessors, a requirement arises that data transfers between modules and within a module increase concomitant therewith. For very fast or high frequency computer systems employing high frequency clock signals, the skew, that is the difference in the time between a asserting edges of a pair of clock signals becomes a significant factor for proper operation of a computer system.

Although synchronous computer systems having a synchronous bus are known generally, multi-processor computer systems employing a synchronous bus present difficulties. One of the difficulties presented is that often the processors or microprocessors used in the multi-processor computer system operate with clock frequencies which are substantially higher than the clock frequency used to operate the synchronous bus. This presents a problem in ensuring that the entire process operates synchronously. This problem is a direct result of clock skew mentioned above.

For proper operation of a computer system, clock signals should arrive at the point where the clock is used on the associated integrated circuit at the same time. The degree to which clock signals arrive at different times or on different modules in a computer system is an indication of the clock skew across the computer system. If a clock signal arrives at a logic circuit on a module earlier than other clock signals to other logic circuits on the module, reliable data transfer may not occur since the earlier arrived signal may assert its edge before data presented to the logic circuit are valid. Conversely, circuits where the clock signal arrives later may assert its edge after data have become invalid.

Thus, the skew provided in a clock system directly increases the amount of time that data must remain stable on a bus to ensure that reliable data transmissions occur. Increasing the amount of time in which the data is required to remain on the bus provides a concomitant decrease in the data transfer rate of the bus, and thus, reduces the speed of the bus in the overall computer system.

Clock skew is related to various factors including variations in propagation delays amongst clock receiver circuits and velocity factor differences in module etchings of a computer system bus interconnect. Furthermore, clock skew can also be introduced by other factors such as processing variations from integrated circuit to integrated circuit, temperature variations across different integrated circuits in the computer system as well as variations due to voltage loading effects.

A second problem also arises in synchronous computer systems in which upgrades to the computer system are desirable. For example, it is well-known that current microprocessor technology generally develops a basic microprocessor which operates using a basic clock speed. As the processing technology improves for the particular microprocessor, however, often times the clock speed of the microprocessor can be increased often times by a factor of two or more. It would be desirable to be able to insert a faster microprocessor in place of a slower microprocessor and still maintain all functionality in the computer system.

Often times, however, this is not possible since not all components connected to the synchronous computer system bus operate using an approach which allows such devices to operate using different clock signals.

SUMMARY OF THE INVENTION

In accordance with the present invention, a synchronous computer system includes a synchronous computer system bus and a plurality of circuit modules coupled to the synchronous bus. The computer system includes at least two processor modules, said processor modules having processors which run asynchronously to each other but with said modules running synchronous to the bus. The system further includes clock generator means for providing a corresponding plurality of clock signals and a plurality of conductors coupled between said clock generating means and said plurality of modules, each of said conductors having electrical paths with substantially the same electrical path length, with each one of said modules further including means, coupled to a corresponding one of said conductors and disposed on said module, for regulating and adjusting skew between clock signals on said module. With such an arrangement, a synchronous, multi-processor computer system is provided with processors which run asychronous to each other but which run synchronous to the system bus. Providing means to adjust skew between clock signals distributed to said plurality of modules and providing a distribution network with conductors having substantially identical path lengths permits the modules to be synchronized and to run synchronous to the system bus.

BRIEF DESCRIPTION OF THE DRAWINGS

The above-mentioned and other features of the invention will now become more apparent by referring to the accompanying description taken in conjunction with the accompanying drawings in which:

FIG. 2 is a schematic diagram of a clock distribution circuit used in the computer system of FIG. 1;

FIG. 3 is a schematic block diagram of a high frequency clock circuit to provide single-ended and differential outputs used in the computer system of FIG. 1;

DESCRIPTION OF THE PREFERRED EMBODIMENTS

Figure 1:
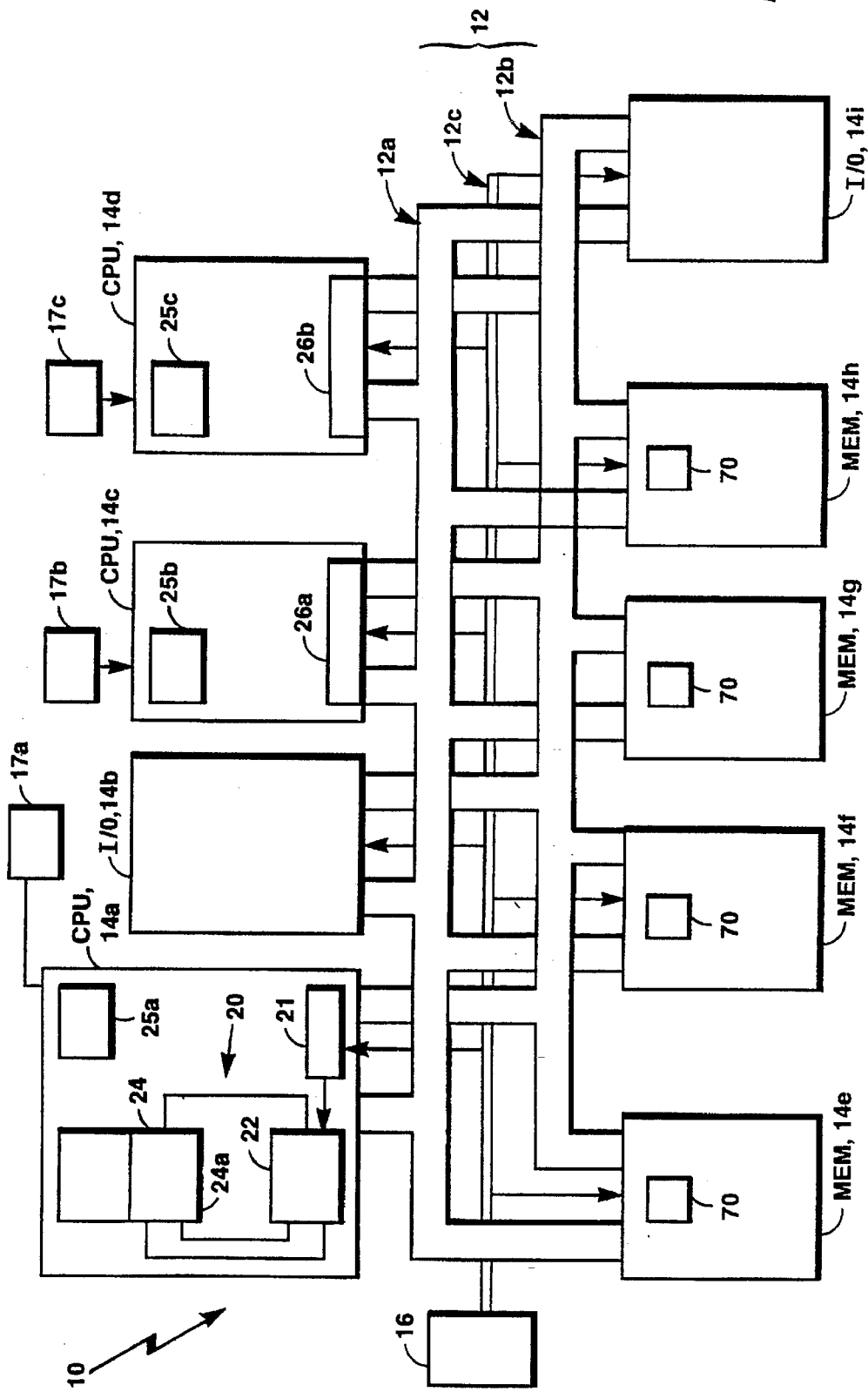
FIG. 1 is a block diagram of computer system using a clock distribution network and having a synchronous computer bus in accordance with the present invention.

Referring now to FIG. 1, a computer system 10 is shown to include a system bus 12 here comprised of an address bus 12a and a separate data bus, 12b which operate using separate independent protocols although other arrangements could alternatively be used. The computer system includes a plurality of modules 14a–14i. Each of the modules, 14a–14i, perform a specific digital type of function in the computer system 10. Illustratively, the modules, 14a–14i, can be processor modules, memory modules, or I/O modules as necessary. The modules 14a–14i each include a system bus interface not shown which couples the module to the address/command bus and the data bus of the system bus 12.

The system bus 12 further includes a clock bus, 12c, which is provided from clock module 16 as will be described in conjunction with FIG. 2. Suffice it here to say that clock module 16 provides here nine identical copies of a clock signal from the module 16 and delivers said signals to each of the modules 14a–14i having substantially minimal skew between any two clock signals along the module. In the embodiment shown in FIG. 1, here illustratively modules 14a, 14c and 14d are CPU modules and are provided with their individual clock circuits, 17a, 17b, and 17c as shown. These individual clock circuits, 17a–17c, provide clock signals for a microprocessor circuit or circuits located on the respective modules, 14a, 14c and 14d. The oscillators are free-running. Thus, the microprocessors run asynchronously with respect to each other and oscillators 17a–17c run asynchronous to the system bus. Here the microprocessors used on modules 14c and 14d are any of the so-called ALPHA microprocessors manufactured by Digital Equipment Corporation, the assignee of the present invention or other suitable microprocessor.

In particular, a feature of the microprocessor used herein is that the input/output interface between the microprocessor circuit and the circuits which interface to the microprocessor on the module 14 permit the microprocessor to synchronize to signals fed to the microprocessor. Details of such a synchronization technique is described in conjunction with U.S. patent application Ser. No. 08/010,107 entitled "State Machine Phase Lock Loop" by James Lundberg et. al. assigned to the assignee of the present invention and whose disclosure is incorporated herein by reference. Each of the modules 14c–14d, can be comprised of a plurality of processors typically one or two processors being used.

As also shown in FIG. 1, each of the modules, 14a–14i, have a clock interface circuit 20 comprised of a clock distribution network 21 which feeds a clock repeater chip 22 and which provides clock signals to a clock distribution network 24a on each one of a plurality (only one being shown) of applications specific integrated circuits (ASIC) 24. The combination of the clock repeater circuit 22 and the clock distribution network 24a of the ASIC 24, provides a technique to reduce clock skew by measuring and compensating for intrinsic propagation delays of a clock signal path through the ASIC. The clock repeater circuit 22 which is located on each of the modules 14a–14i receives one of the system clock signals distributed from the clock circuit 16. Each module, in addition, may contain a plurality of said clock repeater circuits 22. The repeater circuit 22 is preferably a VLSI CMOS custom integrated circuit containing a plurality or remote delay regulator circuits configured to process each input signal to provide an appropriate digital clock output signal therefrom, and it is used to measure delays and compensate for delays in the clock circuit. A preferred implementation of the clock circuit 22 is described in U.S. patent application Ser. No. 08/049,019, filed on Apr. 16, 1993 entitled Method and Apparatus for Clock Skew Reduction Through Remote Delay Regulation by Richard B. Watson et. al. and assigned to the assignee of the present invention and whose disclosure is incorporated herein by reference. An alternative embodiment of the clock repeater circuit 22 is described in U.S. patent application by Russell Ikanian and Richard B. Watson and entitled "Low Skew Remote Absolute Delay Regulator Chip"—Ser. No. 08/269, 237 filed on Jun. 30, 1994.

In the synchronous computer system 10, there are two types of modules provided which have different characteristics with respect to how clock signals from clock circuit 16 are used. In one type of module, illustratively memory modules which by way of example modules 14e through 14h, such modules use the clock signals from clock bus 12c to initiate or control fixed time devices. That is, for example, typically the memory modules 14e–14h will be populated with a plurality of dynamic Random Access Memories. Such memories provide control signals, in particular, RAS (Row Address Strobes)and CAS (Column Address Strobes) which have a fixed-time relationship with respect to each other determined in accordance with the number of clock periods or cycles provided from the clock signal fed to control logic (not shown) on the memory modules. The second type of module typically represented by the I/O module illustratively 14i and 14b and the processor modules 14a, 14c and 14d are synchronous modules in which synchronous logic on the module adapts to changes in clock frequency and, provided propagation delays and set up and hold time criteria are met for the different clock frequencies, the modules will operate in a synchronous manner.

One of the advantages in providing the synchronous bus 12 including the clock bus 12c which distributes identical copies of a common clock signal to each of the modules 14a–14i and by providing processors 25a and 25b on modules and 14d is that the computer system 10 can run completely synchronously whereas, each of the microprocessors, here 25a, 25b can run synchronous to the system bus and hence the rest of the system bus will run mutually asynchronously with respect to one another since each is fed its own clock signal from respective clock modules 17a and 17b as shown. By providing the microprocessor, 25a and 25b with the ability to lock to the clock characteristics of the bus data transfers between the processors 25a and 25b and the bus can be synchronized.

Further, by providing the clock interface circuitry 20 on each of the modules 14a–14i and by distributing regulated clock signals to each circuit on the module which requires use of a clock circuit, the system is divided into separate clock domains or groups of components which require mutually low skew amongst each other but whereas the skew between one domain and another domain does not have to be as tightly controlled or regulated. Therefore, it is possible to provide mutually low skew between CPU interface 26a on module 17a and its associated processor 25a as well as low skew between CPU interface 26b on module 14b and its associated processor 25b, but not provide low clock skew between the individual interfaces 26a and 26b or processors 25a and 25b.

The computer system 10 further includes adaptive timing logic 70 on the memory modules 14e–14h which is part of the bus interface logic (not shown). The memory module includes a set of dynamic finite state machines to control the memory's DRAMs (not shown). These state machines control the timing relationship of the DRAM clocks, RAS and CAS, based on "speed select" inputs from a control and status register. These inputs can be changed by the system to reflect the current bus clock cycle range. Based on these inputs, the DRAM finite state machines reconfigure their state flow and RAS/CAS/control signal timing relationships to maintain as close to a "fixed" absolute timing relationship as possible (measured in nanoseconds—not bus clocks).

Referring now to FIG. 2, the clock module 16 is shown to include an oscillator 30, here a sine wave oscillator, which provides a sine wave having high spectral purity. A typical example of sine wave oscillator 30 is part number CO431 manufactured by Vectron Inc. Danbury, Conn. The output of a sine wave oscillator 30 feeds a bandpass filter 32 which has a passband characteristic which filters out undesired frequency components outside of the band of interest of the oscillator 30. The output of the filter 32 is fed to a zero degree power divider 34 which provides in response to the sine wave signal fed to the input port thereof, nine identical copies at outputs 34a–34c of the power divider 34. These signals are carried by the clock bus 12c to each of the modules in the system 10, as shown in FIG. 1. These signals are provided with mutually minimized skew between any two signals and are distributed to each of the modules 14a–14i (FIG. 1) using electrical paths having substantially identical propagation delays and electrical path lengths to provide at each of the modules substantially identical replicated copies of the clock signal.

The clock bus 12c thus provides from a single clock signal nine identical copies to each of the modules 14a–14i to control all of the synchronous logic on said modules such as interfaces to the bus 12 as well as control of logic on the module, such as the functional logic contained on the memory modules 12e–12h and I/O modules, 14b and 14i. On CPU modules 14a, 14c and 14d, however the microprocessors located on the modules are controlled by independent clock circuits, 17a–17c as shown in FIG. 1.

Here the clock circuit, 17a comprises a sine wave oscillator 40 which provides an output signal having a frequency appropriate for the particular microprocessor 25a, 25b used on modules 14a, 14c and 14d. The output of the oscillator 40 is fed to an attenuator 42 which attenuates the output of the oscillator 40 and provides a signal path having a constant characteristic impedance and thus, the output of the attenuator is used to feed a monolithic microwave integrated circuit amplifier 44. The MMIC is here comprised of a gallium arsenide MESFET having low noise characteristics and high gain at the frequency of the oscillator. The attenuator is used to limit the input drive to the amplifier and thus ensure that the amplifier 44 operates in its linear characteristic range. The amplifier provides an amplifier output signal to an optional bandpass filter 46 which feeds a differential power splitter 48. The differential power splitter here provides from a signal fed at the input in thereof two differential output copies of the clock signal provided from the oscillator 40. Thus, this circuit, when used in the processor CPU module 14a, 14c and 14d can support up to two microprocessors 25a, 25b and 25c on the respective module. The signal is then fed to the microprocessors 25a–25c.

Figure 4:
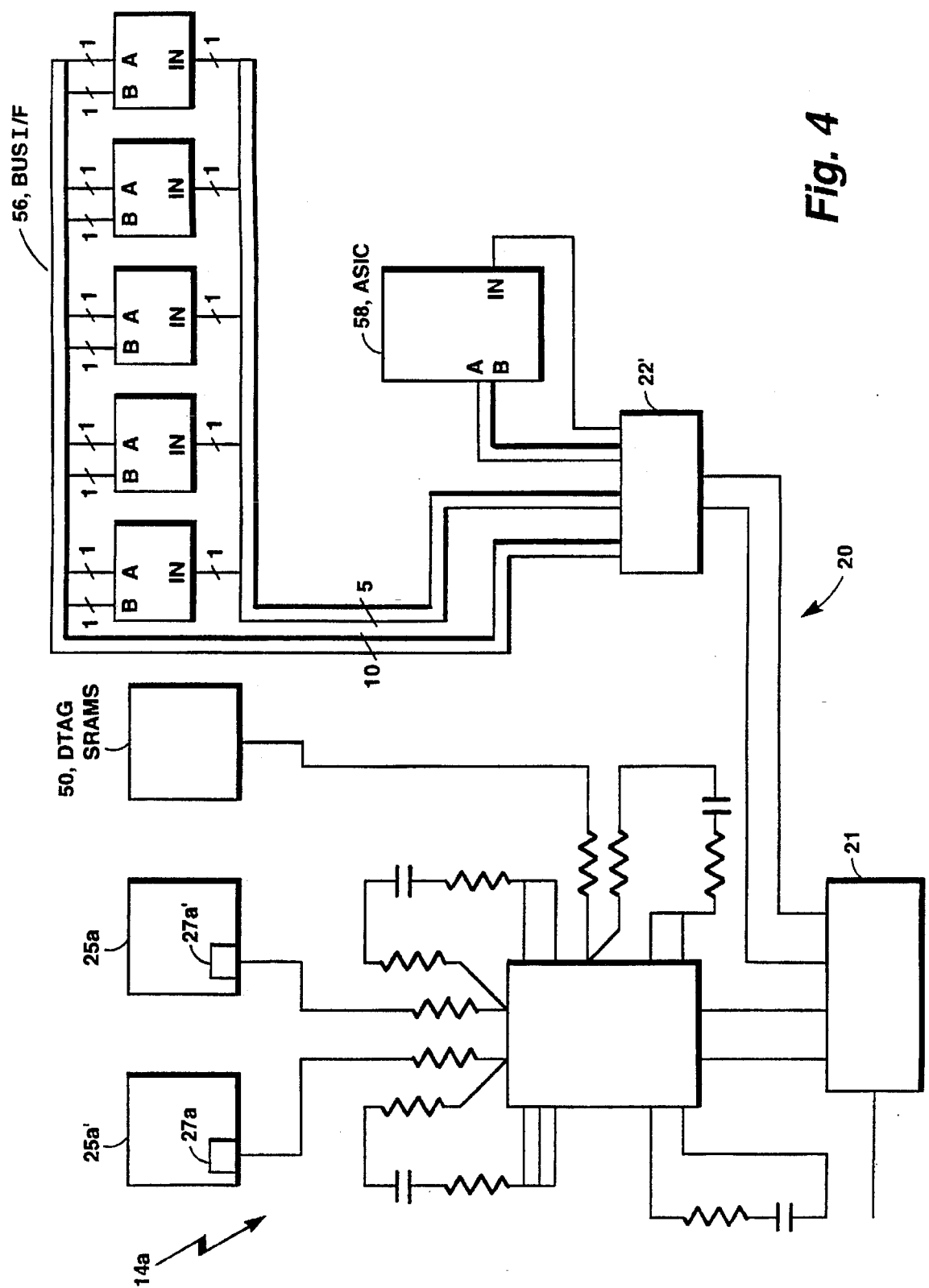
FIG. 4 is a block diagram of a remote delay regulation circuit used on each of the modules of the computer system shown in FIG. 1.

Referring now to FIG. 4, an illustrative example of a typical logic configuration for one of the modules, here module 14a, is shown. Module 14a here includes one of the aforementioned clock interface circuits 20 comprised of a clock distribution circuit 21 here a differential power splitter as described in conjunction with FIG. 3 which feeds two pair differential clock signals to a pair of clock repeater circuits 22 and 22'. Clock repeater circuit 22 here provides output clock signals to the clock interface circuits 27a, 27a' on microprocessors 25a and 25a' respectively as shown and to DTAG SRAMs of a cache memory. Each of these signals are regulated clock signals whose clock signal is regulated at the point of the use of the circuit which is here at the input pin to circuits 27a, 27a' as well as circuits 50 and 52. In the illustrative embodiment, the above mentioned circuits do not have any provision for sensing before and after clock signals from the clock distribution networks of the circuits. In order to adjust the clock signals therefore the input signal is tapped off of the clock repeater circuit 22 and fed back to the before and after inputs of the clock repeater circuit 22 for each regulated clock line. The electrical path length of the replica loop as discussed in the above mentioned clock patent applications, can now be adjusted to vary the phase of the clock signal as it arrives at the input to each of the circuits by changing the electrical pathlength of the replica loop, here shown as a lumped element network. This tuning is thus accomplished by changing values of capacitance of the capacitors in the loop. The tuning allows for optimization of the various clock signals fed to these circuits such that the phase relationships among the clock signals from clock repeater 22 can be adjusted to provide optimum system bus performance.

The second clock repeater circuit 22' provides five groups of here three clock signals to five bus interface circuits 56 and one group of three signals to an application specific integrated circuit (ASIC) 58. Here unlike the circuits described earlier in conjunction with clock repeater circuit 22, the circuits which interface the clock with repeater circuit 22', are provide with the provision for providing "clock before" and "clock after" taps via signal lines coupled to terminals "B" and "A" from the output of the respective circuits such that the clock repeater circuit 22 can measure and compensated for the delay of the clock signal through the clock distribution logic on each of the circuits as mentioned in the above clock regulator circuit patent applications and as will be further described in conjunction with FIG. 5.

Suffice it here to say therefore, by providing a single clock signal to the clock distribution network 21, replicated copies of the signal are provided to each of the above-identified functional logic components and clock skew is minimized within each of the components and amongst the components. Therefore, events which occur in processor 25a or 25a', would be synchronous with respect to the events which occur on bus interface 56 and modules 14a–14i. However, such events would not be synchronous with respect to those events that occur in the individual processors 25b, 25c on modules 14c and 14d (FIG. 1).

Figure 5:
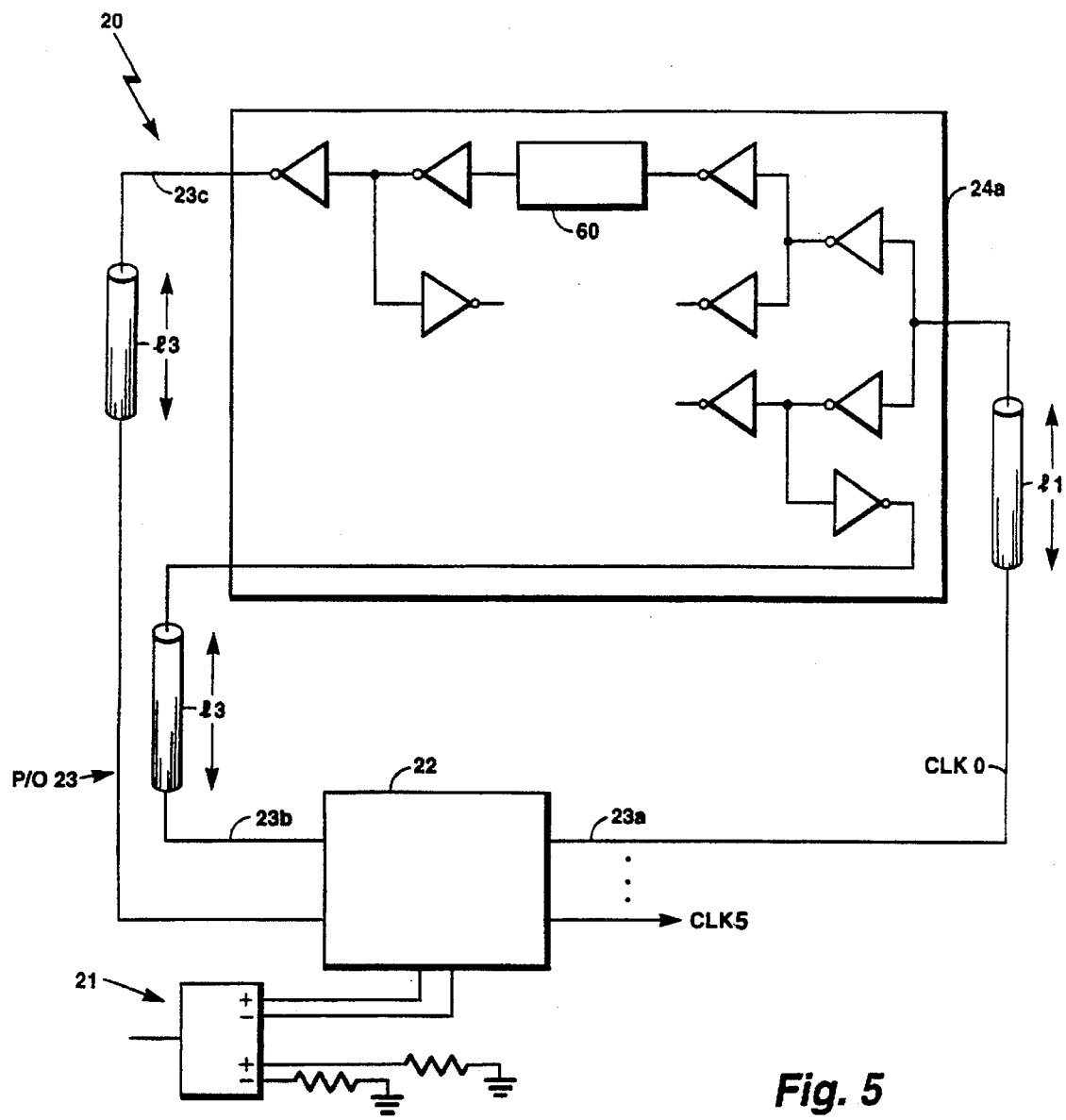
FIG. 5 is a block diagram of a typical module including integrated circuits which receive regulated and controlled clock signals used in the system of FIG. 1.

Referring now to FIG. 5, details of the clock interface used on each of the modules is shown to include the aforementioned power divider 21 and clock repeater circuit 22. In addition, the interface is shown to include the clock distribution portion 24a of a particular application specific integrated circuit 24 (ASIC). As shown, the clock repeater circuit provides here six regulated outputs CLK0 to CLK5. Illustratively CLK0 is fed to the input of an application specific integrated circuit 24 distributed through a plurality buffers (not numbered) to the internal clock distribution network 60 of circuit 24. The arrangement is provided to tap or sense the clock circuit fed to the input of the clock interface 24a and feed that back to the clock repeater circuit 22 as well as to sense or tap the output of the clock after the clock distribution network and feed that back to circuit 22. Circuit 22 regulates and compensates for delay variations in the circuit in accordance with the embodiments described in the above-mentioned patent application respectively.

Accordingly, the computer system 10 operates in a totally synchronous manner whereas while each of the individual microprocessors 25a–25c can operate asynchronously with respect to each other, they operate synchronously with respect to the other modules on the system bus 12.

As mentioned above, there are two types of modules within the computer system 10, one type being a synchronous module which adapts to changes in clock frequencies in accordance with setup-and- hold time-and-propagation delay characteristics of the logic circuits coupled thereto, and fixed timing event modules which require a fixed time between clock edges for generation of timing signals. The latter class of modules are tyically represented by memory modules 14e–14h.

In order to allow for easy upgrades of the computer system 10, such as when faster microprocessors, 25a–25c become available due to improvements in processing technology, for example, it is desirable to be able to change the clock oscillator on circuit 16 and still have the entire system 10 operate synchronously. Although this arrangement is not a problem, with respect to those modules which operate in a synchronous manner, the modules, in particularly, the memory modules which operate using fixed event timing, will pose a problem when changing the clock speed of the bus 12.

Therefore, each of the modules 14, include as part of their interface a set of dynamic finite state machines to control generation of signals to the devices on the module. In particular, these state machines control timing relationships of the RAS and CAS signals derived from the clock signals based upon speed select inputs provided to a controlled and status register. These inputs are changed by the system to reflect current bus clock cycle timing. Based upon these inputs, the finite state machines configure their state flow and RAS and CAS control signal timing relationships to maintain as close to a fixed absolute timing relationship as is possible. That is, the timing relationship is configured in nanoseconds rather than bus cycles. The speed select inputs from the control and status register are used to determine the clock cycle in which RAS and CAS signals are asserted and deasserted to DRAMS on each of the memory modules 14e–14a. The phase of the bus cycle during which CAS is either asserted or deasserted is moved based upon the value of the speed select inputs. The logic which accomplishes this gives one-half of bus clock timing granularity on these signals instead of a full clock cycle and the timing of the communication signals from the DRAM finite state machine to the bus controlling state machine is also moved to an earlier state for slower bus clocks based upon the speed select inputs.

This arrangement permits the bus to be notified earlier in bus clocks, or at nearly the same time in absolute time that the read data is available or that a write to memory is complete and memory is available for other transactions.

Figure 6:
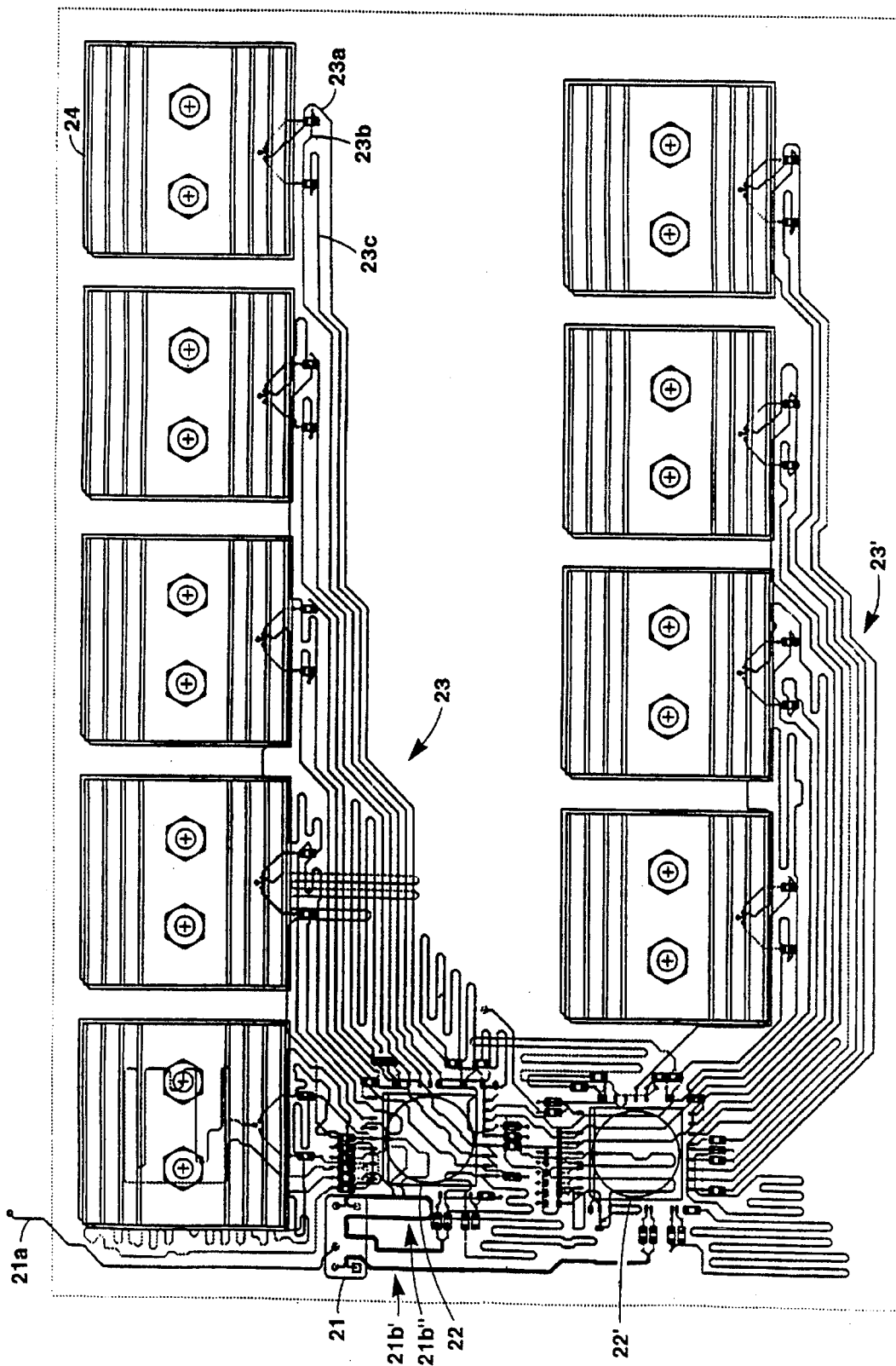
FIG. 6 is a layout of a typical module showing a typical distribution of clock signal lines for use in each of the modules shown in FIG. 1 in accordance with the present invention.

Referring now to FIG. 6, a representative layout of a module 14a is shown to include the power splitter circuit 21 coupled to receive the input clock signal via line conductor 21a and provide a pair of differential outputs along differential output pair 21b' 21b'' to a corresponding pair of clock repeater circuits 22 and 22'. Here circuits 22 and 22' provide a pair of clock distribution networks 23, 23', respectively, with each network comprising three clock signal lines for each one of the ASICs 24. The clock signal lines 23a, 23b and 23c are respectively the clock input signal to the ASIC, the before clock distribution sense tap from the ASIC and the after clock distribution tap from the ASIC as described above in conjunction with FIG. 5. Each of the lines 23a and 23a' have substantially the same electrical path length whereas each of the lines 23b and 23c as well as 23b' and 3c' likewise have the same electrical path length. This arrangement when used on each of the modules 14a–14i as shown in FIG. 1 provides a multiprocessor computer system 10 which operates in a synchronous manner. Moreover, since the bus 12 is a synchronous bus which interfaces to all of the modules and since all the modules use the same clock signal provided from the clock circuit 16, all of the circuits on the modules operate in a synchronous manner even though the processor modules on the bus operate asynchronously to each other.

Accordingly, with this arrangement a fully synchronous system 12 is provided which can adapt to variations in processor clock requirements. Thus as the processors change in clock speed, illustratively by process improvements and so forth, the oscillators in circuits 17a–17c as well as 16 can be likewise changed to accommodate for different bus speeds and still maintain the entire bus synchronization mechanism. In particular, by use of the adaptive memory access as described above, the entire bus system can be run synchronously.

Having described the third embodiments in the invention, it will now become apparent to one of ordinary skill in the art that other embodiments incorporating its concepts may be used. Accordingly, it is felt that the invention should not be limited to the disclosed embodiments, but rather should be limited only by the spirit and scope of the appending claims.

What is claimed is:

1. A synchronous computer system comprising:
   a synchronous computer system bus;
   a plurality of modules coupled to the synchronous bus, comprising:
   at least two processor modules, said processor modules having processors which run asynchronously to each other but with said processor modules running synchronous to the bus;
   clock generator means for providing a corresponding plurality of clock signals;
   a plurality of conductors coupled between said clock generating means and said plurality of modules, each of said conductors having electrical paths with substantially the same electrical path length, with each one of said modules further comprising:
   means, coupled to a corresponding one of said conductors and disposed on said module, for regulating and adjusting skew between clock signals on said module with said processors disposed to run asychronous to each other but run synchronous to the synchronous system bus with said means for adjusting clock skew providing mutually low skew amongst clock signals on each of said modules and whereas the skew between one module and another module is not affected by said means for adjusting.

2. The system of claim 1 wherein said plurality of modules further comprises:
   at least one memory module, having circuits which interface to the synchronous bus and which have circuits which provide timing signals which are related to the frequency of the clock signals fed to the module.

3. The system of claim 2 wherein said memory module further comprises means for adjusting the relationship between the timing signals and the frequency of the clock.

4. The system of claim 3 wherein said clock generator means comprises:

an oscillator for providing an output signal; and means coupled to the oscillator for dividing said output signal into a plurality of substantially identical signals.

5. The system of claim 4 wherein each of the processors of the processor modules comprises:

processor clock generator means for providing a clock signal to the respective processor on the respective module.

6. The system of claim 5 wherein each of said clock generator means and said clock generation means are asychronous to each other.

7. A synchronous computer system comprising:

a synchronous computer system bus;

a plurality of circuit modules coupled to the synchronous bus, comprising:

at least two processor modules, said processor modules having processors which run asynchronously to each other but with said modules running synchronous to the bus; and a corresponding plurality of high speed free running clock generation circuits to provide free running clock signals processors on a corresponding one of the processor modules;

system bus clock generator means for providing a corresponding plurality of clock signals;

a plurality of conductors coupled between said clock generating means and said plurality of modules, each of said conductors having electrical paths with substantially the same electrical path length, with each one of said modules further comprising:

means, coupled to a corresponding one of said conductors and disposed on said module, for regulating and adjusting skew between clock signals on said module; and wherein in response to said means for adjusting skew said processors run asychronous to each other but run synchronous to the synchronous system bus with said means for adjusting clock skew providing mutually low skew amongst clock signals on each of said modules and whereas the skew between one module and another module is not affected by said means for adjusting.

* * * * *